(12) United States Patent
Miller et al.

(10) Patent No.: US 8,770,629 B2
(45) Date of Patent: Jul. 8, 2014

(54) CRIMPABLE OR SWAGEABLE FLUID POWER FERRULES, COUPLINGS, SYSTEMS AND METHODS

(71) Applicants: Marvin Miller, Westminster, CO (US); Jonathan Clark Swift, Cambridgeshire (GB); Matthew James King, Parker, CO (US); Geoffrey Richard Keast, Cambs (GB); Timothy G. Robinson, Denver, CO (US)

(72) Inventors: Marvin Miller, Westminster, CO (US); Jonathan Clark Swift, Cambridgeshire (GB); Matthew James King, Parker, CO (US); Geoffrey Richard Keast, Cambs (GB); Timothy G. Robinson, Denver, CO (US)

(73) Assignee: The Gates Corporation, Denver, CO (US)

( * ) Notice: Subject to any disclaimer, the term of this patent is extended or adjusted under 35 U.S.C. 154(b) by 169 days.

(21) Appl. No.: 13/713,161

(22) Filed: Dec. 13, 2012

(65) Prior Publication Data

US 2013/0099479 A1    Apr. 25, 2013

Related U.S. Application Data

(63) Continuation of application No. 12/313,406, filed on Nov. 20, 2008, now Pat. No. 8,360,479.

(51) Int. Cl.
*F16L 33/00* (2006.01)

(52) U.S. Cl.
USPC .......................................... 285/256; 285/259

(58) Field of Classification Search
USPC ......... 285/256, 259, 242, 382, 238, 240, 241, 285/318
See application file for complete search history.

(56) References Cited

U.S. PATENT DOCUMENTS

| | | | |
|---|---|---|---|
| 1,808,101 A | 6/1931 | Eastman | |
| 2,121,624 A | 6/1938 | Cowles | |
| 2,273,398 A | 2/1942 | Couty et al. | |
| 2,314,002 A | 3/1943 | Lusher et al. | |
| 2,517,669 A | 8/1950 | Hufferd et al. | |
| 2,797,111 A | 6/1957 | Beazley | |
| 3,191,975 A * | 6/1965 | La Marre et al. | 285/243 |

(Continued)

FOREIGN PATENT DOCUMENTS

| | | | |
|---|---|---|---|
| EP | 523 835 A1 | 5/1992 | |
| EP | 1 564 472 A1 | 8/2005 | |

(Continued)

*Primary Examiner* — Aaron Dunwoody
(74) *Attorney, Agent, or Firm* — Jeffrey A. Thurnau, Esq.; Paul N. Dunlap, Esq.

(57) ABSTRACT

A hose end coupling comprising a unitary one-piece stem having an exterior barb end portion and an exterior ferrule interface portion, with a unitary one-piece radially crushable ferrule disposed over the stein, with a crushable socket portion disposed about the barb end portion, a deformable attachment portion disposed about the ferrule interface portion, and a torque communication portion defined between the socket portion and the attachment portion. The socket portion may retain a "C" shaped insert, one or more coiled inserts, or a plurality of stacked inserts, for gripping a hose end and the socket portion might define a lip, with a seal disposed in the socket portion between the insert(s) and the lip. Some embodiments of a "C" shaped insert define inner-circumferential teeth and corresponding outer-circumferential depression indentions.

12 Claims, 4 Drawing Sheets

(56) References Cited

U.S. PATENT DOCUMENTS

| | | |
|---|---|---|
| 3,687,491 A | 8/1972 | Marshall |
| 4,099,748 A | 7/1978 | Kavick |
| 4,319,774 A | 3/1982 | Kavick |
| 4,498,691 A | 2/1985 | Cooke |
| 4,804,212 A | 2/1989 | Vyse |
| 5,267,758 A | 12/1993 | Shah et al. |
| 5,317,799 A | 6/1994 | Chapman et al. |
| 5,553,896 A | 9/1996 | Woodward |
| 6,296,283 B1 | 10/2001 | Dietzel |
| 6,626,469 B2 | 9/2003 | Favre et al. |
| 2006/0131878 A1 | 6/2006 | Wulf et al. |
| 2009/0072532 A1 | 3/2009 | Dixon-Roche |

FOREIGN PATENT DOCUMENTS

| | | |
|---|---|---|
| EP | 1 740 873 B1 | 4/2008 |
| FR | 1.495.499 | 6/1966 |
| WO | 91 08414 | 6/1991 |
| WO | 2008 103315 A3 | 8/2008 |

* cited by examiner

CRIMPABLE OR SWAGEABLE FLUID POWER FERRULES, COUPLINGS, SYSTEMS AND METHODS

CROSS-REFERENCE TO RELATED APPLICATION

This continuation application claims priority from co-pending non-provisional application Ser. No. 12/313,406 filed Nov. 20, 2008 and such prior application is hereby incorporated by reference.

BACKGROUND OF THE INVENTION

1. Field of the Invention

This invention relates generally to attachable couplings of the male-stem, ferrule type for use with reinforced, flexible hose but more particularly, this invention relates to such couplings, which employ a ferrule with or without an insert for gripping a hose end, wherein the ferrule may include a torque communication portion.

2. Description of the Prior Art

Couplings of the type that are post assembled to an end of a finished hose product typically have a male-stem portion that is insertable into a hose end and a ferrule that is concentric with the male-stem. Together, the male-stem and ferrule define an annular cavity for receiving a hose end. A coupling is retained by pinching the hose end in the annular cavity between the ferrule and stem such as by either radially reducing some part or element of the ferrule or by radially increasing the size of the male-stem.

Some couplings are of the reusable type and use a mechanical means of the coupling such as threaded members that activate means for pinching a hose against a stem. An example of such a reusable coupling appears in European patent EP0241651 where a plurality of coaxial rings having alternating frustoconical surfaces are axially pressed together by a threaded member to wedge alternate rings radially inwardly. The wedged rings pinch a hose against a stem. Such reusable couplings are usually expensive because the co-acting parts forming the coupling are typically machined from barstock. Furthermore, the amount of pinching cannot be precisely controlled for a range of hoses when the coupling is attached to a hose.

Crushable types of ferrules that may be of different sizes for different hose constructions having the same bore size are preferred for accurately controlling how an end of a hose is pinched. For example, radially reducing the size of a ferrule by crushing it to a smaller diameter may be accomplished through crimping processes that use a plurality of circumjacently arranged die fingers.

Oftentimes, a serrated stem with a ferrule locking collar is used for high pressure hoses that are subjected to pressure impulses. For convenience of assembly, a ferrule may be pre-attached to a stem such as by crimping an end portion of the ferrule to the ferrule locking collar. While preattachment of a ferrule to a stem has advantages associated with reducing the number of parts for assembly to a hose, it introduces a disadvantage as to the number of parts required for a line of hose sizes because some hoses require the same size stem but different size ferrules. For example, three different size ferrules may be used with the same size stem for coupling one-half inch ID hose having different tube, reinforcement, and cover combinations. Consequently, some manufacturers prefer to select an appropriate ferrule for a hose when it is to be crimped on a hose so as to minimize inventory.

To address these and other problems, a ferrule for use in attaching a hose end portion to a male-stem was developed and patented in U.S. Pat. No. 5,267,758, wherein the ferrule has a crushable socket portion which retains a bendable sleeve-like insert having substantially a "C" shape. This insert employs means, such as ribs formed along an inside surface, for gripping a hose end. In another form, the sleeve-like insert has a plurality of offset teeth at circumjacently spaced end portions of its "C" shape which teeth interdigitate with each other when the ferrule is used for attaching a hose end portion to a male-stem. The teeth accommodate a range of hose diameters and hose constructions. However, notably the disclosed and claimed crimped-on coupling is made-up of three primary components: a stem, adapted to be inserted into a hose; a staked collar, which includes wrenching flats or the like, typically employed as a "back-up hex"; and a ferrule, which houses the aforementioned "C" shaped insert.

SUMMARY

The present invention is directed to coupling, and associated systems and methods which employ a unitary integrated ferrule, with or without an insert, for gripping a hose end, wherein the ferrule may include torque communication and attachment portions in addition to a socket portion, thereby eliminating one component and one possible leak path in a crimped-on, swaged-on or similarly installed, coupling.

In accordance with various embodiments of the present invention, a unitary one-piece radially crushable ferrule might comprise a crushable socket portion, an attachment portion, and a torque communication portion, which is, generally contiguous with the socket portion and the attachment portion, and provides torque communication to an attached fluid power component. This torque communication to an attached fluid power component may be provided following securement of the attachment portion to the component. The securement might comprise deformation of the attachment portion to interface with the component. The torque communication portion is preferably defined between the socket portion and the attachment portion and the torque communication portion preferably retains functional shape following crushing of the socket and deformation of the attachment portion to secure the ferrule to the component.

In most embodiments the socket portion retains an insert for gripping a hose end portion and preferably interfacing with an interior of the socket portion to prevent movement of the hose. This insert may be a "C" shaped insert, one or more coiled inserts, or a plurality of generally circular stacked inserts. Also, the socket portion might comprise a lip defined in an extent of the socket portion opposite the torque communication portion, and a seal may be disposed in the socket portion between the insert(s) and the lip.

A portion of a wall of the ferrule defining the torque communication portion may be thicker than a portion of the wall defining the socket portion and/or the portion of the wall of the ferrule defining the torque communication portion may be thicker than a portion of the wall defining the attachment portion. Alternatively, the portion of the wall defining the torque communication portion and the attachment portion may be thicker than a portion of the wall defining the socket portion.

An embodiment of a method of the present invention might include the following steps. Formation of a torque communication portion in a unitary one-piece radially crushable ferrule, contiguous with a crushable socket portion and an attachment portion formed in the ferrule. As noted the torque communication portion may be formed between the socket portion and the attachment portion. The forming of the ferrule might include shaping the ferrule from a single cylindrical sleeve having a uniform wall thickness by drawing the socket portion from the cylindrical sleeve such that the socket portion and/or the attachment portion have a wall thinner than a wall of the torque communication portion. The attachment portion may be disposed over a hose stem and the attachment portion secured to the stem. This securing might comprise deforming (i.e. staking) the attachment portion to interface with the stem. An open hose end is preferably inserted into the crushable socket portion and onto the stem and the socket portion is crushed to secure the coupling end to the hose.

An insert may be deployed in the socket portion, following forming of the ferrule. The insert preferably grips the hose and frictionally interfaces with an interior of the socket following the crush of the socket. As noted such an insert may be "C" shaped. Such a "C" shaped insert may define inner-circumferential teeth and corresponding outer-circumferential depressions. This "C" shaped insert may be formed by rolling the "C" shaped insert from barstock or sheet material having raised splines, that become inner-circumferential teeth upon the rolling, and that has corresponding indentions that become outer-circumferential depressions.

Thus, embodiments of a hose end coupling on the present invention might comprise a unitary one-piece stem having an exterior barb end portion and an exterior ferrule interface portion. A unitary one-piece radially crushable ferrule is, in accordance with the present invention, disposed over the stem. Preferably, the ferrule comprises a crushable socket portion disposed about the barb end portion, an attachment portion disposed about the ferrule interface portion, and a torque communication portion, contiguous with the socket and attachment portions. As noted, the torque communication portion may be defined between the socket portion and the attachment portion. Additionally, the exterior ferrule interface portion may be knurled. The ferrule interface portion might additionally or alternatively comprise an exterior circumferential longitudinal stop groove, with at least a portion of the attachment portion disposed about the longitudinal stop groove for staking into the groove to interface with the stop groove.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
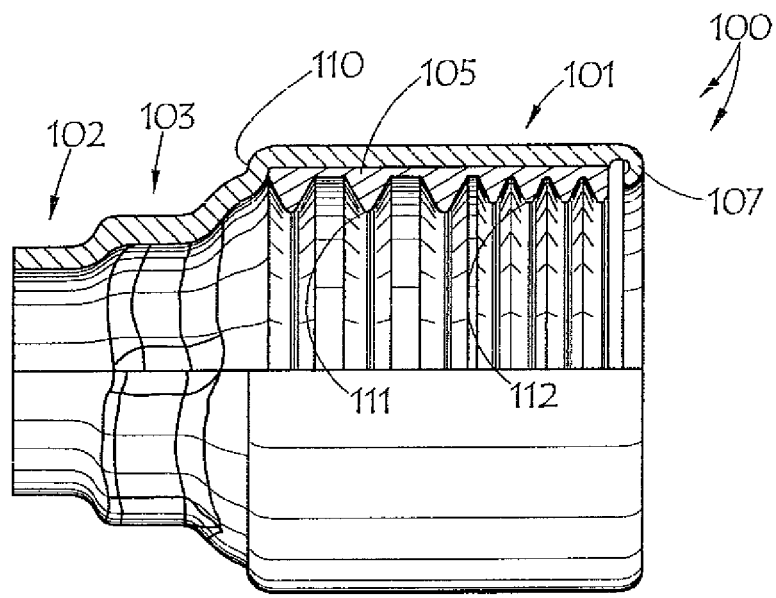
FIG. 1 is a fragmented, generally quarter-sectioned, side view of an embodiment of the present inventive ferrule.
Figure 5:
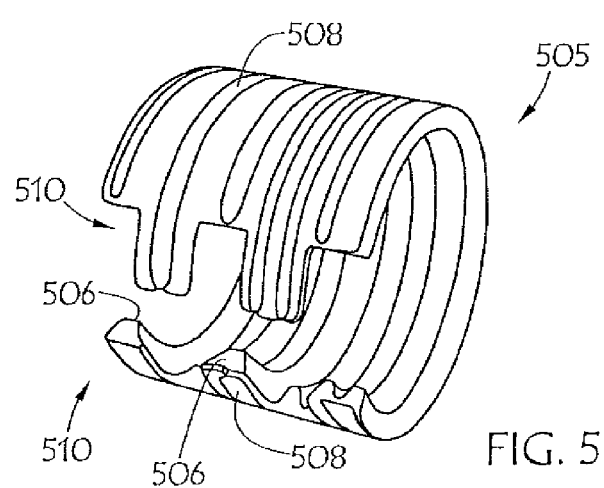
FIG. 5 is a perspective view of one embodiment of a "C" insert that may be employed in the present couplings, systems and methods.
Figure 6:
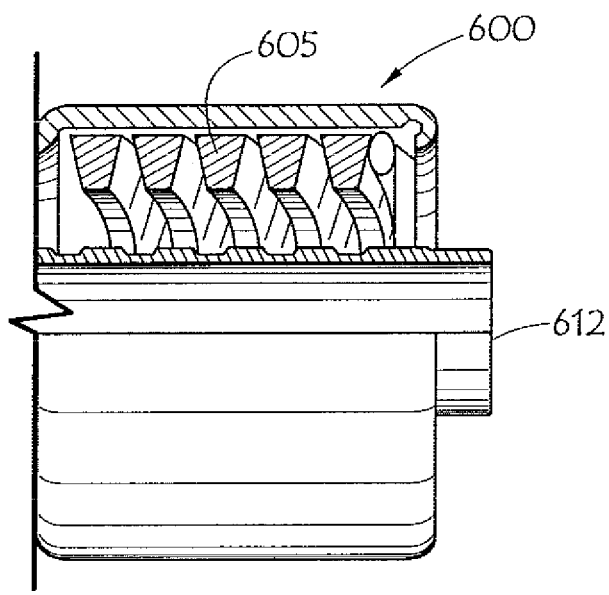
FIG. 6 is a fragmented, generally quarter-sectioned, side view of an embodiment of a ferrule employing a coiled insert in accordance with various embodiments of the present invention.
Figure 7:
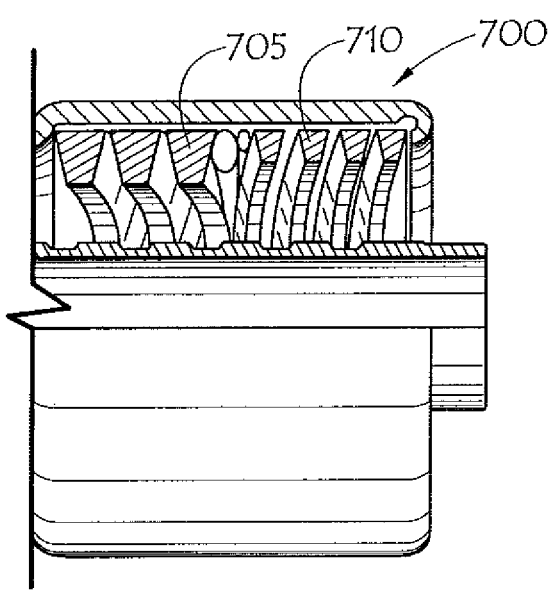
FIG. 7 is a fragmented, generally quarter-sectioned, side view of an embodiment of a ferrule employing a plurality of coiled insert in accordance with various embodiments of the present invention.

FIG. 1 is a fragmented, generally quarter-sectioned, side view of an embodiment of unitary one-piece radially crushable ferrule 100 comprising crushable, generally tubular socket portion 101, stakeable, deformable or otherwise securable attachment portion 102, and a torque communication portion 103, generally contiguous with socket and attachment portions 101 and 102. As shown in FIGS. 1 through 4 torque communication portion 103 may be disposed between socket portion 101 and attachment portion 102. Alternatively, the socket, attachment and torque communication portions might be disposed in other arrangements, for example the attachment portion might be disposed between the torque communication portion and the socket portion. Torque communication portion 103 might take a generally hexagonal configuration, such as shown in FIGS. 1 through 4, or any other usable "wrenching" shaped such as a square or other polygonal shape. Ferrule 100 may be made in a number of manners, such as by machining from barstock, swaging or drawing a preformed tubular member, or by deep drawing and stamping flat sheet stock into a tubular shape. It is preferably formed from sheet stock for economical considerations In various embodiments socket portion 101 retains insert 105 for gripping a hose end portion. Preferably, insert 105 is generally cylindrical. Insert 105 may be "C" shaped as shown in FIG. 5 or it might take another form, such as coiled insert 605 shown in FIG. 6 or a plurality of coiled inserts 705 and 710, such as shown in FIG. 7, each of which is discussed below in greater detail. Insert 105 preferably includes a plurality of circumferentially oriented teeth 111, 112 on its inside surface for gripping a hose end. Some of the teeth 111 may have a greater height than other teeth 112. Additionally or alternatively, teeth for gripping a hose may be disposed transversely within the insert. The insert may be made of any suitable material for gripping hose such as plastic, alloys with aluminum, and alloys with iron. The insert may be formed in any number of ways, such as by casting, machining it from barstock, injection molding, or optionally and for economical reasons, it may be formed or shaped from an elongate strip of material. The insert could also take a number of other forms. For example, a number of non-continuous or continuous, generally washer-shaped units could be stacked into socket 101. In particular non-continuous stacked inserts could be in the general form of a split-ring, similar to a split lock washer or in the form of an incomplete annulus, similar to a snap-ring.

Returning to FIG. 1, socket portion 101 might define a lip (107), such as in an extent of socket portion 101 opposite torque communication portion 103. Lip 107 might be used to retain insert 105 and/or a weather seal, of unbroken circumference, might be disposed in a socket between the insert and the lip, as discussed in greater detail below, to act as a weather seal and/or to seal any possible leak path, such as might be perceived as being introduced through the use of a "C" shaped, or other non-continuous, insert or the like.

Figure 2:
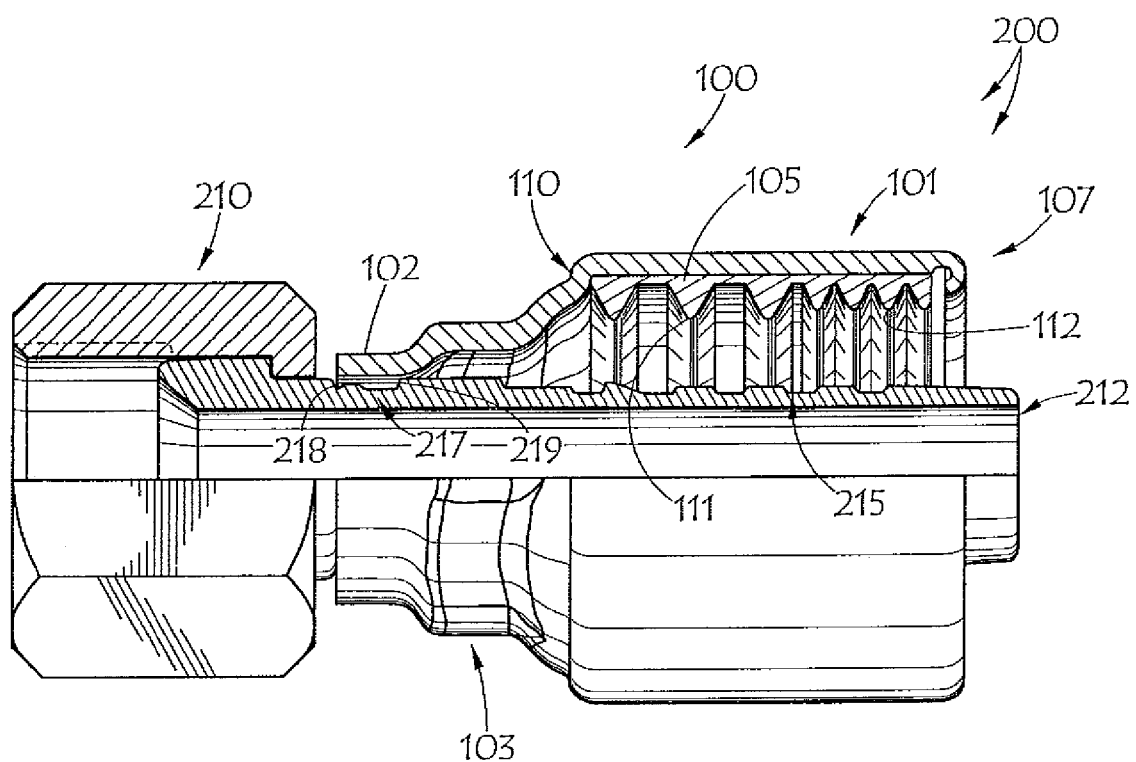
FIG. 2 is a fragmented, generally quarter-sectioned, side view of an embodiment of the present inventive ferrule deployed in conjunction with a stein and nut of an embodiment of the present inventive coupling, prior to securing of the ferrule on the stem.
Figure 3:
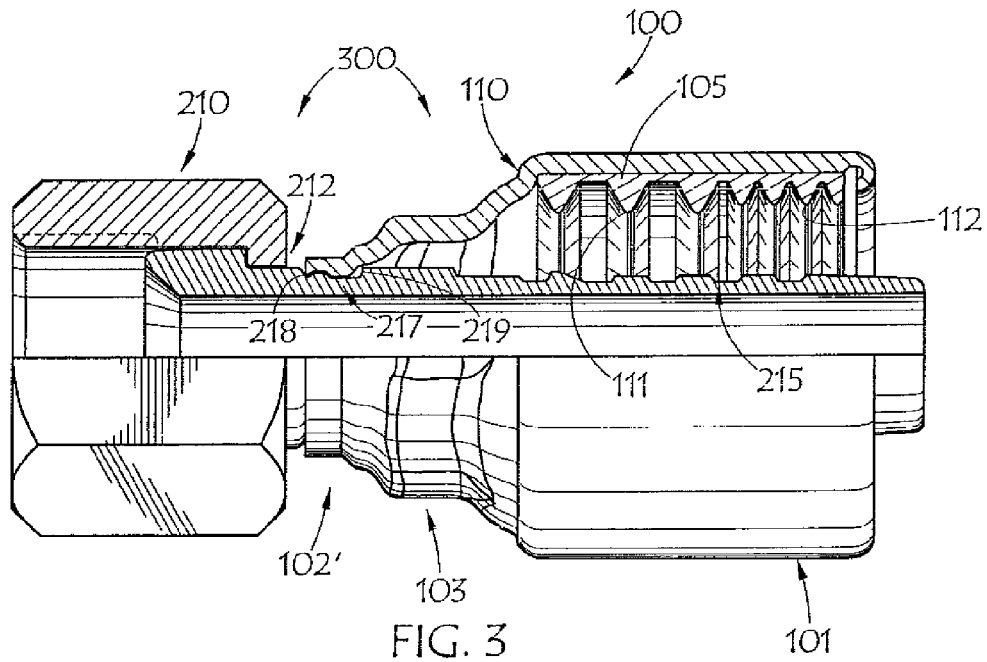
FIG. 3 is a fragmented, generally quarter-sectioned, side view of an embodiment of the present inventive coupling, with the ferrule secured to the stem.

Advantageously, in accordance with the present invention, the number of parts employed in a crimped-on fitting is reduced. Ferrule 100 replaces a collar having a back-up hex, or a stem with a unitary hex, either of which is may be employed in the prior art, with the present torque communication portion and attachment portion. Thus, a complete fitting such as shown in fragmented, generally quarter-sectioned, FIGS. 2 and 3 may, in accordance with various embodiments of the present invention, employ nut 210, stem 212, and an embodiment of present ferrule 100, which integrates socket 101, attachment portion 102, and torque communication portion 103 into a unitary one-piece unit, eliminating the need for a separate collar, or the like. In accordance with the present invention, embodiments of ferrule 100 may be staked or otherwise attached directly onto stem 212, such as by staking attachment portion 102 onto a corresponding portion of stem 212. Alternatively, stem 212 may be expanded to interface with ferrule 100 to attach the two parts. FIG. 2 shows an embodiment of ferrule 100 deployed in conjunction with stem 212 and nut 210, prior to securing of the ferrule on to the stem, while FIG. 3 shows coupling 200, with ferrule 100 secured to stem 212. Stem 212 also may have a knurled, generally deformed, or deformable portion under the stake, which interfaces with ferrule 100 in such a manner as to provide torque resistance between the ferrule and the stem.

Thus, an embodiment of hose end coupling 200 might, in accordance with the present invention, include the aforementioned unitary one-piece radially crushable ferrule 100 having crushable socket portion 101, securable attachment portion 102, and torque communication portion 103, which might be disposed between the socket and attachment portions. Such a coupling might also employ unitary one-piece stem 212 having exterior barb end portion 215 and exterior ferrule interface portion 217. When deployed, socket portion 101 may be disposed over and about barb end portion 215 and attachment portion 102 may be disposed over and about ferrule interface portion 217. Exterior ferrule interface portion 217 may be knurled. For example, ferrule interface portion 217 may be an exterior circumferential longitudinal stop groove, as shown in FIGS. 2 and 3 and attachment portion 102 may be disposed over and about longitudinal stop groove 217 for staking into the groove to interface with a knurl defined in conjunction with stop groove 217, securing ferrule 100 from rotational or axial movement relative to stem 212. In particular, in accordance with various embodiments, the knurl associated with interface groove 217 interfaces with ferrule attachment portion 102 to secure the staked ferrule from rotation relative to stem 212, and at least a portion of staked ferrule attachment portion 102 is deformed into interface groove 217 such that interface groove walls 218 and 219 prevent movement of ferrule 100 axially, along stem 212.

Hence, a method for providing a hose end coupling in accordance with the present invention might call for fashioning an embodiment of ferrule 100 of the present invention, such as shown in FIG. 1, by forming a torque communication portion in a unitary one-piece radially crushable ferrule, such as between a crushable socket portion and a deformable attachment portion formed in the unitary one-piece radially crushable ferrule. The area underneath or behind torque communication portion 103 may be hollow. In certain embodiments a reinforcement insert (not shown) may be disposed in such a hollow to reinforce torque communication portion 103. For example, a hexagonal shaped reinforcement insert, shaped generally like a nut, could be disposed behind a hex-shaped torque communication portion of a ferrule of the present invention. In deployment of ferrule 100, deformable attachment portion 102 is preferably disposed over hose stem 212, as shown in FIG. 2 and attachment portion 102 is staked, or otherwise secured, to stem 212 in a fashion that would result in coupling 300 shown in FIG. 3. Assembled coupling 300 is secured to a hose by inserting an open hose end into crushable socket portion 101, onto stem barb 215, and crushing socket portion 101, such as through crimping or swaging, to secure the coupling to the hose end, providing the hose end coupling shown in FIG. 4. To enhance gripping of the hose end by the coupling, insert 105, such as the aforementioned "C" shaped insert, one or more coiled inserts, or a number of flat stacked inserts may be deployed in socket portion 101 following forming of the ferrule, but prior to crushing of the socket portion. Inserts thus deployed grip the cover of the hose and frictionally interface with an interior of the socket following crushing of the socket.

Figure 4:
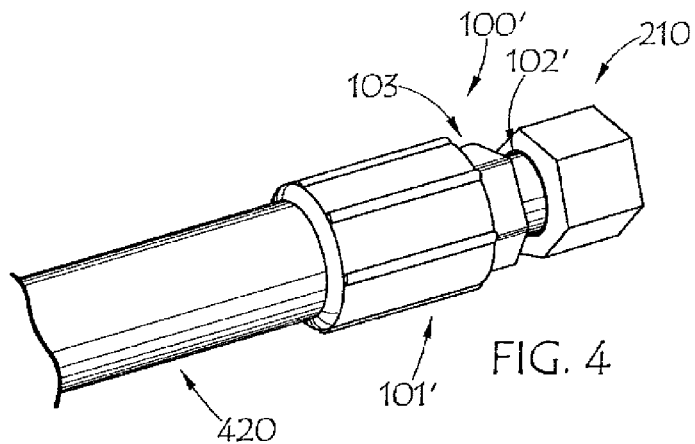
FIG. 4 is a perspective view of an embodiment of the present inventive coupling crimped onto a hose end.

FIG. 4 shows an embodiment of present inventive coupling 100' crimped onto an end of hose 420. Ferrule 101' is shown crimped onto the hose end and attachment portion 102' is shown staked onto a stem (not visible). Hence, hose 420 as shown in FIG. 4 is ready for attachment to a fluid power system by threading nut 210 onto an adapter or other termination. Preferably staking, or similar attachment, of attachment portion 102 and crimping or swaging of socket 101 affords torque communication portion 103 a degree of reinforcement, such that it may function to provide torque communication to an attached fluid power component, such as stem 212 and thereby stabilizing the coupling for attachment to an adapter or other termination.

Lip 107 may be formed by coiling a portion of socket 101 back upon itself, such as by orbit forming the outside diameter of the socket behind an insert after it is inserted. Alternatively, a lip may be formed by deforming an extent of socket 101 to provide a thickening, folding a crease, or similar structure resulting in a lip. In accordance with various embodiments of the present invention this coiled lip portion has a dual function; it retains the insert before crimping of the socket and also acts as a weather seal. This weather seal function can be further enhanced through the use of the aforementioned seal, of generally unbroken circumference, which might be disposed in the socket between the insert and the lip. To facilitate forming of lip 107, step 110 may be formed in ferrule 100, between torque communication portion 103 and socket 101. Step 110 may be employed to aid in positioning the ferrule during orbit forming of lip 107.

In various embodiments of ferrule 100 one portion of the wall of the ferrule may be thicker than another portion. For example, in FIG. 1 a portion of the ferrule wall defining torque communication portion 103 is thicker than a portion of the wall defining socket portion 101. The portion of the ferrule wall defining torque communication 103 portion may also be thicker than a portion of the wall defining attachment portion 102. To form such a ferrule a single cylindrical sleeve having a uniform wall thickness, such as a thickness corresponding to the thicker portion of the ferrule may be used. The shaping of the ferrule might include drawing the ferrule portion for the cylindrical sleeve such that the socket portion has a wall thinner than a wall of the torque communication portion, and in some embodiments, thinner than the attachment portion, while in other embodiments the ferrule may have a generally uniform wall thickness, such the ferrules shown in FIGS. 2 and 3.

FIG. 5 is a perspective view of "C" insert 505, an embodiment of an insert that may be employed in the present couplings, systems and methods. "C" shaped insert embodiment 505 defines inner-circumferential teeth 506 and corresponding outer-circumferential depression indentions 508. This design allows insert 505 to be formed by rolling barstock or sheet material having raised splines, that become inner-circumferential teeth 506, and corresponding indentions, that become outer-circumferential depressions 508. Following crimping or other crushing of a socket housing "C" insert 505, not only do teeth 505 "bite" into the hose cover, but outer-circumferential depressions 508 mechanically interface with the interior of the socket, allowing material comprising the interior of the socket to flow into the depressions, arresting longitudinal movement of the hose and/or the ferrule along the axis of stem 112. Additionally, illustrated "C" insert embodiment 505 has fingers 510, which interdigitate upon crimping of a socket housing the insert.

As discussed above, in accordance with some embodiments of the present invention one or more coiled inserts may be deployed in conjunction with a radially crushable ferrule. Embodiments of such a ferrule may or may not have the attachment and/or a torque communication portions shown in FIGS. 1 through 4. For example, FIG. 6 is a fragmented, generally quarter-sectioned, side view of an embodiment of ferrule 600, which employs a coiled insert in accordance with various embodiments of the present invention. Ferrule 600 might be primarily a crushable socket, wherein coiled insert 605 for gripping a hose end is retained. The cross section of the coiled insert can be round, trapezoidal as shown in FIG. 6, or profiled to best suit a particular application, such as may vary based on the material making up ferrule 600 and/or the cover of the hose to be gripped. As ferrule 600 is crimped, swaged, or otherwise deployed on a hose, over stem 612, the coiled insert reduces in diameter to grip the hose. Material of the coiled insert can be steel including stainless steel, aluminum, plastic or other suitable material. The coiled insert can be close coiled, open coiled, square ended, open ended, ground ended or not ground. As noted, more than one coiled insert may be used. As shown in FIG. 7 an embodiment of ferrule 700, employing two coiled inserts might use first large gauge coiled insert 705 to grip a hose tightly and second smaller gauge insert 710 to provide an even seal. In the illustrated embodiment of FIG. 7, the two inserts are coiled in opposite directions to help eliminate any potential for the hose to rotate within the coupling. However two or more inserts coiled in the same direction may be used.

The use of a coiled insert results in a number of advantages. The insert may be created from simpler and cheaper components. The methods and materials used to manufacture a coiled insert are industry standard. Additionally, a coiled insert may more easily be deployed into a ferrule socket having a lip, eliminating any need to orbit form the lip after insertion of the insert. For example the insert may be diametrically compressed, such as by elongating or constricting the insert to allow insertion of the insert into the socket. Alternatively, a coiled insert may be "screwed" into the socket. A series of coiled insert sections can be used, as can inserts made from different materials. Thus, an ability to choose the number and/or nature of insert coils, depending on application requirements, is provided.

Figure 8:
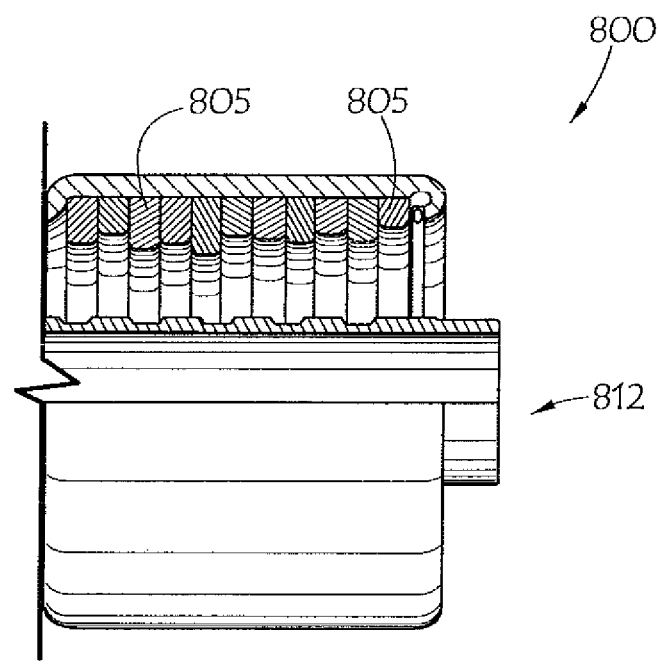
FIG. 8 is a fragmented, generally quarter-sectioned, side view of an embodiment of a ferrule employing a plurality of stacked inserts in accordance with various embodiments of the present invention.

FIG. 8 is a fragmented, generally quarter-sectioned, side view of an embodiment of ferrule 800, which employs a number of generally circular stacked inserts 805, in accordance with various embodiments of the present invention. Ferrule 800 might also be primarily a crushable socket, wherein stacked inserts 805 for gripping a hose end are retained. These stacked inserts may take a form similar to a split ring lock washer, a form similar to an annular snap ring, or any other similar form. The cross section of each stacked insert can be round, trapezoidal, stepped, or otherwise profiled to best suit a particular application, such as may vary based on the material making up ferrule 800 and/or the cover of the hose to be gripped. As ferrule 800 is crimped, swaged, or otherwise deployed on a hose, over stem 812, the stacked inserts reduce in diameter to grip the hose and the outer edges of each of the stacked inserts preferably interfaces with an interior of the socket preventing movement of the stacked inserts and hence the hose relative to the socket. The stacked inserts may be made from steel, stainless steel, aluminum, plastic or other suitable material.

Figure 9:
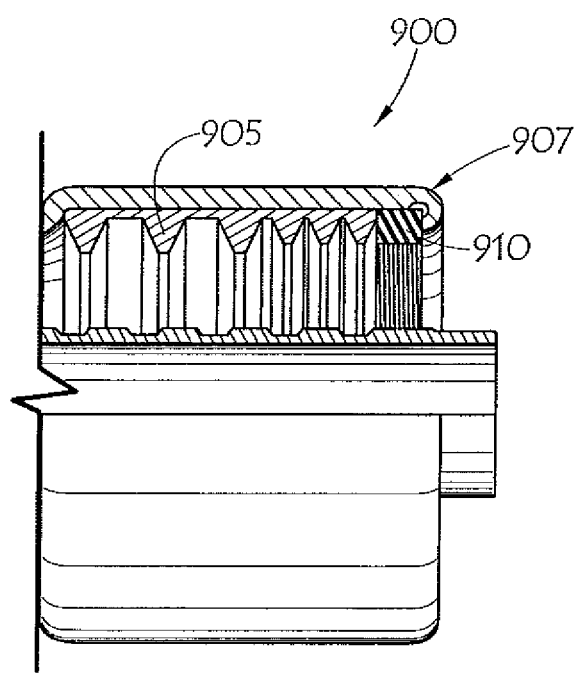
FIG. 9 is a fragmented, generally quarter-sectioned, side view of an embodiment of a ferrule employing a weather seal in accordance with various embodiments of the present invention.

As discussed above, in accordance with some embodiments of the present invention a weather seal may be deployed in conjunction with a radially crushable ferrule. Embodiments of such a ferrule may or may not have an attachment portion and/or a torque communication portion, such as shown in FIGS. 1 through 4. For example, FIG. 9 is a fragmented, generally quarter-sectioned, side view of ferrule embodiment 900 employing a weather seal in accordance with various embodiments of the present invention. Ferrule 900 might be primarily a crushable socket, wherein lip 907 is defined in an extent of the ferrule socket, such as at an end. Preferably, insert 905, for gripping a hose end portion, is retained in ferrule 900, with seal 910 disposed in the socket, between insert 905 and lip 907. Alternatively, a lip may be formed in each end of the ferrule and a seal may be disposed in each end of the socket, between each of the lips and the insert.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A radially crushable hose coupling system, comprising:
a ferrule;
a crushable socket portion;
a plurality of generally circular stacked inserts retained in said socket portion, disposed about a hose inserted in said socket portion, and gripping said hose upon crushing of said socket portion; and
each of said inserts comprises a split ring.

2. The coupling of claim 1, wherein outer edges of each of said inserts interfaces with an interior of said socket portion preventing movement of said stacked inserts and said hose relative to said socket portion.

3. The coupling of claim 1 wherein said ferrule is a unitary one-piece ferrule further comprising an attachment portion and a torque communication portion contiguous with said socket portion.

4. The coupling of claim 1, wherein a portion of a wall of said ferrule defining said torque communication portion is thicker than a portion of said wall defining said socket portion.

5. A radially crushable hose coupling system, comprising:
a ferrule;
a crushable socket portion;
a plurality of generally circular stacked inserts retained in said socket portion, disposed about a hose inserted in said socket portion, and gripping said hose upon crushing of said socket portion, each of said inserts comprises a split ring; and
said socket portion further comprises a lip defined in an extent of said socket portion and said ferrule further comprises a seal disposed in said socket portion between said stacked inserts and said lip.

6. The coupling of claim 5, wherein outer edges of each of said inserts interfaces with an interior of said socket portion preventing movement of said stacked inserts and said hose relative to said socket portion.

7. The coupling of claim 5, wherein said ferrule is a unitary one-piece ferrule further comprising an attachment portion and a torque communication portion contiguous with said socket portion.

8. The coupling of claim 5, wherein a portion of a wall of said ferrule defining said torque communication portion is thicker than a portion of said wall defining said socket portion.

9. A radially crushable hose coupling system, comprising:
a ferrule;
a crushable socket portion;
a plurality of generally circular stacked inserts retained in said socket portion, disposed about a hose inserted in said socket portion, and gripping said hose upon crushing of said socket portion; and
each of said inserts comprises a split ring.

10. The coupling of claim 9, wherein outer edges of each of said inserts interfaces with an interior of said socket portion preventing movement of said stacked inserts and said hose relative to said socket portion.

11. The coupling of claim 9, wherein said ferrule is a unitary one-piece ferrule further comprising an attachment portion and a torque communication portion contiguous with said socket portion.

12. The coupling of claim 9, wherein a portion of a wall of said ferrule defining said torque communication portion is thicker than a portion of said wall defining said socket portion.

* * * * *